Dec. 27, 1932.

G. F. HITCHCOCK

LANTERN

Re. 18,704

Original Filed July 2, 1928

2 Sheets-Sheet 1

Inventor

Guy F. Hitchcock

By

Hardway & Talley

Attorneys

Dec. 27, 1932.

G. F. HITCHCOCK

LANTERN

Re. 18,704

Original Filed July 2, 1928 2 Sheets-Sheet 2

Inventor

Guy F. Hitchcock

By Hardway & Cathey

Attorneys

Reissued Dec. 27, 1932

Re. 18,704

UNITED STATES PATENT OFFICE

GUY F. HITCHCOCK, OF HOUSTON, TEXAS, ASSIGNOR OF ONE-HALF TO THOMAS H. MEEKS, OF HARRIS COUNTY, TEXAS

LANTERN

Original No. 1,768,763, dated July 1, 1930, Serial No. 289,962, filed July 2, 1928. Application for reissue filed May 2, 1932. Serial No. 609,339.

This invention relates to new and useful improvements in a lantern.

One object of the invention is to provide a lantern of the character described which has been specially designed for use in giving signals and is equipped with a bail, or handle, which is hinged to the globe guard, or lantern frame, and which is equipped with means for rendering said bail rigid, with respect to said frame, when desired.

Another object of the invention is to provide a lantern, of the character described having a novel type of hood adapted to receive the upper end of the lantern globe and formed to fit different types of globes.

Another object of the invention is to provide in a lantern a novel type of flame guard which serves also as a seat to receive the lower end of the globe.

A still further feature of the invention resides in the provision of means for maintaining the lantern frame in its proper shape said means also forming anchors for the attachment of the bail thereto.

With the above and other objects in view the invention has particular relation to certain novel features of construction, operation and arrangement of parts an example of which is given in this specification and illustrated in the accompanying drawings wherein:—

Figure 1:
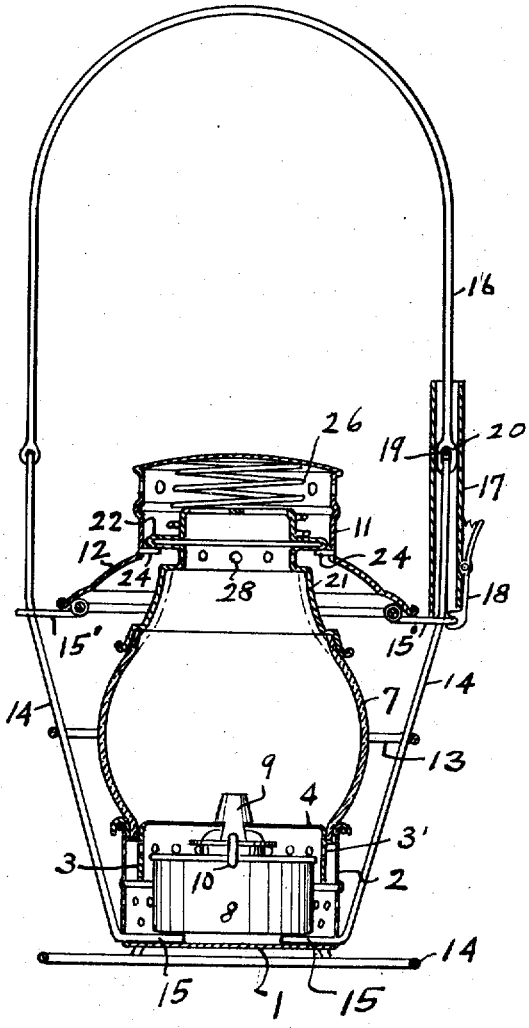
Figure 1 shows a vertical sectional view of the lantern.

Referring now more particularly to the drawings wherein like numerals of reference designate similar parts in each of the figures, the numeral 1 designates the base of the lantern which is provided with a perforated upstanding annular band 2 and located within the upper part of said band is a guard 3 whose upper margin 4 is inwardly curved. This guard has an external annular flange 5 spaced beneath the upper end thereof and whose rim 6 upstands therefrom and is outwardly curved and fits over and rests on the upper margin of the band 2. The bottom of the globe 7 is fitted between the rim 6 and the upper portion of the guard 3 and rests on the flange 5. Above the base of the lantern and surrounded by the guard 3 there is a conventional oil container 8, having the burner 9 secured thereto, which is equipped with the usual wick adjusting shaft 10. This shaft works through one of the slots 10′ cut in the upper edge of the guard 3. Said guard has an annular row of perforations 3′ beneath the flange 5 through which air may be supplied to the burner. The numeral 11 designates a dome whose sides are perforated. The dome has a downwardly flared skirt 12. A cage like structure 13 is secured to this skirt, and forms a guard or frame which surrounds and protects the globe 7 and is attached to the base 1, and the bottom ring of this frame forms a wide base support for the lantern. The frame includes the oppositely disposed side bars 14, whose lower ends are inwardly turned and extend through the base of the lantern and the oil container 8 rests on said inwardly turned ends. These bars 14 extend up through the side brackets 15′ carried by the upper end of the frame and the ends of the bail 16 are hinged to the upper ends of the bars 14. There is a sleeve 17 slidable on the bail. This sleeve may be moved into active position as shown so as to embrace the hinge between one end of the bail and the corresponding end of a bar 14. When in such position the bail will be held substantially rigid with respect to said bars 14. There is a spring pressed dog 18 pivoted to said sleeve 17 and adapted to engage the corresponding bracket 15′ to hold said sleeve in such position.

Figure 2:
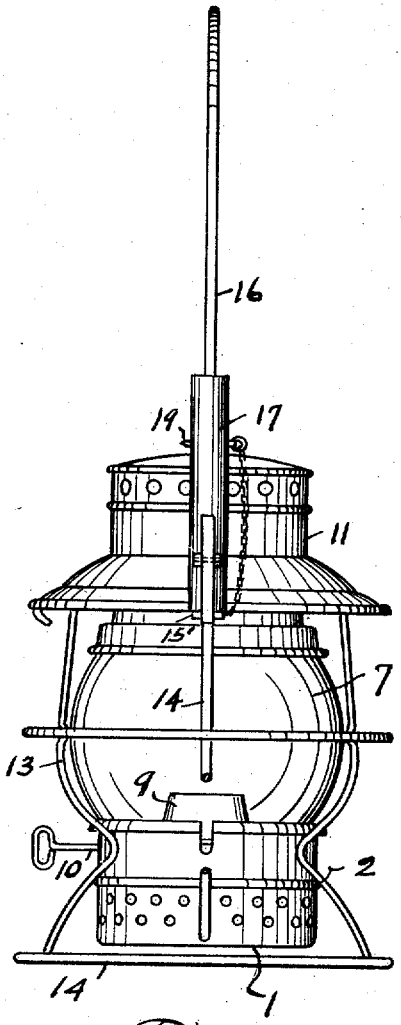
Figure 2 shows a side view thereof partly broken away.
Figure 3:
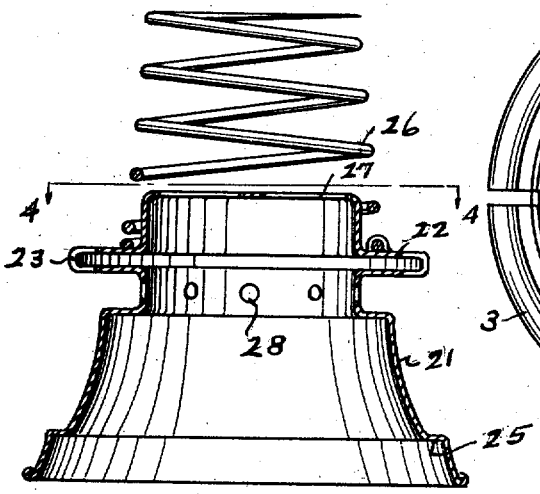
Figure 3 shows a vertical sectional view of the globe hood.
Figure 5:
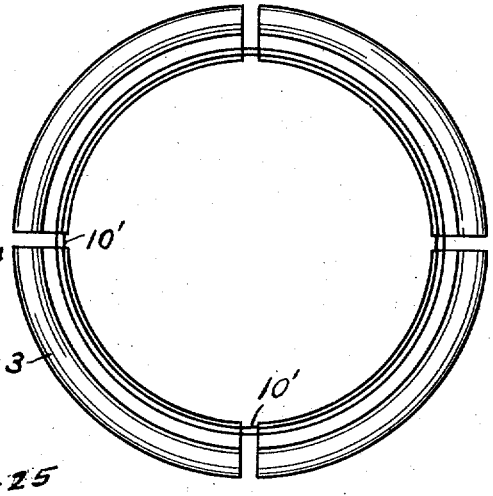
Figure 5 shows a plan view of the burner guard.
Figure 6:
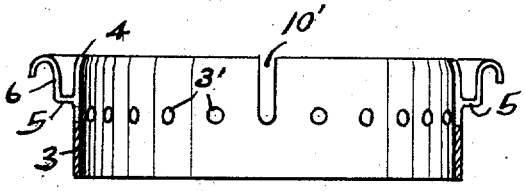
Figure 6 shows a vertical sectional view thereof.
Figure 4:
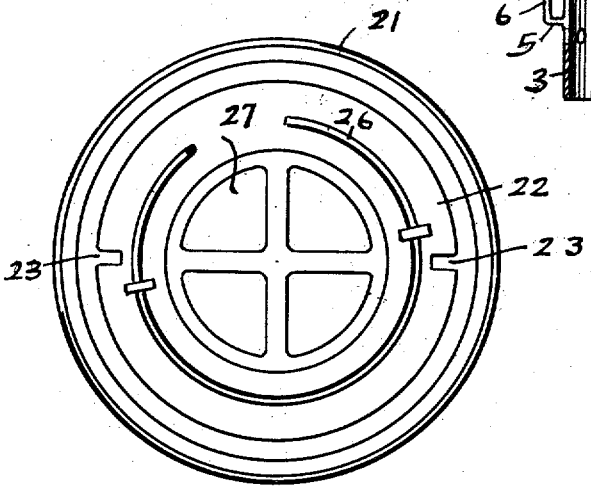
Figure 4 shows a cross sectional view thereof, taken on the line 4—4 of Figure 3.

If desired a key 19 may be inserted through the sleeve and through the eye 20 of the adjacent end of the bail, to further secure said sleeve in said position. When a rigid bail is not desired said sleeve 17 may be released and moved above the hinge joint and it will be held in such supporting position by the engagement of the dog 18 against the eye 20. There is a downwardly flared hood 21 whose upper end is reduced and formed with an outwardly extending annular flange 22. This flange 22 has oppositely disposed marginal notches 23, 23 and the inner side of the dome 11 has the oppositely disposed inwardly extending pins 24, 24. When it is desired to assemble the hood with the dome, the notches 23 are brought into registration with the pins 24 and then moved upwardly until the flange 22 is above the pins 24 and then turned to carry the notches 23, out of registration with said pins. The lower end of the hood has the inside seat 25 which rests on the upper end of the type of globe shown in Figures 1 and 2. In case a longer type of globe is used its upper end will extend up further in the hood as indicated in dotted lines in Figure 1. This type of hood is employed so that globes of different dimensions, particularly of different lengths, may be used. The hood is held yieldingly against the globe by a coil spring 26 which is interposed between the upper end of the dome and the upper end of the hood.

It is to be noted that the seat 25 fits firmly against the upper end of the globe and when in this position the flange 22 will be slightly above the pins 24 so that the hood will rest yieldingly against the upper end of the globe. The upper end of the hood 21 has the opening 27 to permit the heat, gas, and smoke to pass out and also has an annular row of perforations 28 for a similar purpose.

If the bail were attached only to the upper end of the frame the said frame would have a tendency to lengthen or stretch, with use, permitting the globe to become loose in the frame and to rattle, and to prevent this the side bars 14 have been provided with their lower ends connected to the lantern base and with the bail secured to the upper ends thereof.

The joint between the lower end of the globe and the flange 5 will be practically air tight but if the air enters around the globe the current will be directed upwardly by the upper edge of the guard 3 and thus deflected from the burner.

While I have shown what I now consider the preferred form of the invention it is obvious that mechanical changes may be made therein and equivalents substituted for the parts shown and I reserve the right to make such mechanical changes and substitutions as may be found desirable within the scope of the appended claims.

What I claim is:

1. In a lantern having a frame, a base, and a bail; side bars incorporated into the frame whose lower ends are connected to the base and to the upper ends of which the respective ends of the bail are hingedly connected, and a sleeve slidable on said bail and movable into position over one of the hinges by which the bail is connected to said bars to render the bail substantially rigid with respect to said bars and a yieldably mounted dog carried by the sleeve and engageable with the frame to hold said sleeve in active position.

2. In a lantern having a frame, a globe therein, a base connected to the lower part of the frame and having an upstanding perforated band, and an oil container on said base having a burner; a perforated guard around the burner having an outside seat on which the lower end of the globe rests, said seat having an upstanding rim which fits around the lower end of the globe and whose margin is outwardly curved and rests on the upper margin of said band, side bars incorporated into the frame whose lower ends are inwardly turned and extend through said band underneath the oil container and a bail connected to the upper ends of said side bars.

3. In a lantern having a frame, a base and a bail; a globe in the frame, a hood on the frame said hood being inwardly offset to provide an inside annular seat to receive the upper end of the globe, said hood being upwardly tapered above said seat to form another seat above the first mentioned seat to receive the upper end of a longer globe.

4. A lantern including a frame, a globe therein, a hood on the frame having an inside annular seat to receive the upper end of said globe, said hood being contracted above said seat, said contracted portion being tapered upwardly to form another seat, above said first mentioned seat to receive the upper end of a longer globe.

5. In a lantern a hood having an inside annular abutment forming a seat to receive the upper end of a lantern globe, said hood being reduced above said abutment and upwardly tapered to form another inside seat above the first mentioned seat to receive the upper end of a globe longer than the globe first mentioned.

In testimony whereof witness my signature, this 20 day of April, A. D. 1932.

GUY F. HITCHCOCK.